United States Patent
Vo (10) Patent No.: US 8,166,830 B2
(45) Date of Patent: May 1, 2012

(54) METER DEVICES AND METHODS

(75) Inventor: Anh Nhat Vo, Houston, TX (US)

(73) Assignee: Dresser, Inc., Addison, TX (US)

( * ) Notice: Subject to any disclaimer, the term of this patent is extended or adjusted under 35 U.S.C. 154(b) by 116 days.

(21) Appl. No.: 12/830,082

(22) Filed: Jul. 2, 2010

(65) Prior Publication Data

US 2012/0000281 A1     Jan. 5, 2012

(51) Int. Cl.
*G01F 15/00*     (2006.01)
(52) U.S. Cl. .................................................. 73/861.77
(58) Field of Classification Search .............. 73/861.77, 73/861.363, 861.94, 861.351, 861.92, 861.353
See application file for complete search history.

(56) References Cited

U.S. PATENT DOCUMENTS

| | | | | |
|---|---|---|---|---|
| 3,036,462 A | * | 5/1962 | Levins ........................ | 73/861.353 |
| 3,049,009 A | * | 8/1962 | McCall et al. .............. | 73/861.92 |
| 4,523,479 A | * | 6/1985 | Johnson ...................... | 73/861.351 |
| 6,539,913 B1 | * | 4/2003 | Gardiner ..................... | 123/231 |

OTHER PUBLICATIONS

"Timken Ceramic Ball Bearings" [online], published at least as early as Jul. 1, 2010, Retrieved from the Internet URL:http://www.timken.com/en-us/products/bearings/productlist/ball/precision/Pages/ceramic.aspx.
"Barden Ceramic Hybrid Precision Ball Bearings", The Barden Corporation, 1993.
Popp, M., Sternagel, R., Pfeiffer, W., Blug, B., Meier, S., Wötting, G., Frasseck, L., "Hybrid- and Ceramic Rolling Bearings with modified Surface and low Friction Rolling Contact", EUROMAT 99, vol. 4, Microstructural Investigation and Analysis, Wiley Europe, Sep. 1999.

* cited by examiner

*Primary Examiner* — Jewel V Thompson
(74) *Attorney, Agent, or Firm* — Woodcock Washburn LLP (57) ABSTRACT

Some embodiments of a meter device for measuring volume flow of gas can include bearings and the timing gears may each include a least one component comprising a ceramic material that enhances the wearability of the bearing and the timing gears. Accordingly, the gas flow meter can operate in a manner that reduces or eliminates the need for external oil lubrication of the bearings and the timing gears (e.g., the external oil lubrication conventionally provided by the oil bath compartment), and thus reduces the likelihood of failure of the gas flow meter due to leaks or failures of the oil bath compartment.

14 Claims, 7 Drawing Sheets

METER DEVICES AND METHODS

TECHNICAL FIELD

This document relates to meter devices and method of operating meter devices, such as gas flow meter devices that are used to measure the flow of natural gas or other fluids.

BACKGROUND

Natural gas and other fluids may be transported, distributed, and/or sold to customers through a system of transmission and distribution lines. For purposes such as billing and inventory control, for example, gas metering systems may be installed at various locations along these gas lines. Gas metering systems may measure the volume of gas that flows through a particular gas line. Some gas metering systems include a gas meter and an electronic or mechanical volume corrector.

One type of gas meter is a rotary gas meter. In some rotary gas meters, gas flowing through the meter causes a set of impellers to rotate within a cylinder. Each impeller rotation indicates that a certain volume of gas has flowed through the meter. In general, the performance of a meter is unlikely to improve over time, as bearings and gear system in the gas meter become worn or contaminated. As the bearings or timing gears wear due to friction, it is possible that the volume measurement accuracy of a rotary flow type meter will degrade. To combat this degradation in performance and extend the life of the meter, bearings, gears, and other mechanical components are generally exposed to a lubrication oil bath within the meter. The oil fluid in the lubrication oil bath may be sealed in a compartment that is internal to the gas flow meter body. The oil can lubricate the various mechanical parts of the meter such as the timing gears and the bearings. Such a configuration, however, normally requires the oil to be exchanged from the sealed compartment or otherwise requires the lubricant oil bath compartment to be periodically serviced. In a gas flow system that includes a large number of gas meters, the service and repair of the lubricant oil bath compartments in the gas flow meters can be time consuming.

SUMMARY

Some embodiments of a meter device for measuring volume flow of gas can be configured to operate without a lubrication oil bath compartment for any of the bearings and timing gears. In such circumstances, the bearings and the timing gears can operates in a surrounding environment that is free of an oil bath. In particular embodiments, the bearings and the timing gears may each include a least one component comprising a ceramic material that enhances the wearability of the bearing and the timing gears. Accordingly, the gas flow meter can operate in a manner that reduces or eliminates the need for external oil lubrication of the bearings and the timing gears (e.g., the external oil lubrication conventionally provided by the oil bath compartment), and thus reduces the likelihood of failure of the gas flow meter due to leaks or failures of the oil bath compartment.

For example, one or more of the impellers in the gas flow meter can be supported by hybrid bearings having ceramic rolling elements and steel raceways. Such bearing supports for the impellers can significantly improved performance in the lower start/stop rate and lower pressure differential, and further the hybrid bearings allow the impellers to rotate with little or no lubricants internal to the bearings. In addition, the timing gears that rotate in response to rotation of the impellers in the gas flow meter can have a hard ceramic coating (e.g., a ceramic material substantially similar to the ceramic rolling elements of the support bearings). This ceramic interface between the timing gears can substantially reduce the rolling friction between the gears, and in some embodiments may reduce or eliminate the requirement for applying external lubricants (e.g., an oil bath) to the timing gears.

In some embodiments, a meter device for measuring volume flow of gas may include a flow meter housing having an inlet and an outlet through which a fluid flows to rotate first and second impellers. The device may also include first and second shafts in the housing that rotates in response to rotation of the first and second impellers. The first shaft may be rotatably supported in the housing by at least a first roller bearing. The second shaft may be rotatably supported in the housing by at least a second roller bearing. Each of the first and second roller bearings may include metal raceways that engage with ceramic rolling elements. The device may further include first and second timing gears having an exterior ceramic coating and that rotate in response to rotation of the first and second shafts. The timing gears may engage one another along the exterior ceramic coating in an oil-less environment in which space surrounding the timing gears is free of oil.

Particular embodiments described herein include a method of operating a gas flow meter device. The method may include rotating first and second impellers in a gas flow meter housing as a gas is advanced from an inlet to an outlet. The first impeller may be supported by a first shaft rotatably mounted in the housing, and the second impeller may be supported by a second shaft rotatably mounted in the housing. The method may also include, in response to rotation of the first and second impellers, causing first and second hybrid bearing assemblies to rotate in the housing such that ceramic rolling elements contained in each of the hybrid bearing assemblies engage with metal raceways. The first hybrid bearing assembly rotatably may support the first shaft in the housing, and the second hybrid bearing assembly rotatably may support the second shaft in the housing. The method may further include, in response to rotation of the first and second impellers, causing first and second timing gears having an exterior ceramic coating to rotate and engage one another in an oil-less environment in which space surrounding the timing gears is free of oil.

These embodiments and other embodiments described herein may provide one or more of the following advantages. First, some embodiments of a gas meter device can operate with improved performance characteristics and a capability to operate in an oil-less construction (e.g., without external lubrication or oil bath for any of the bearings that support the impellers and the timing gears that rotate in response to the impeller rotation). As such, the requirement for manual repair of the sealed oil bath compartment or for other external lubrication service of the gas flow meters can be greatly reduced. Second, the bearings that support the impellers in the gas flow meter can configured in a manner that improved the performance of the gas flow meter while reducing the need for service or repair. For example, the bearing may be hybrid bearings having ceramic rolling elements and steel raceways, which thereby provide lightweight material, increased hardness, dissimilar materials at the rolling interface, and measurably lower staring and running torque. These improved characteristics can significantly enhance the performance of gas flow meters, and especially large gas flow meters with higher volume capacity. Third, some embodiments of a gas flow meter that employ both the hybrid bearings and the improved timing gears (e.g., having a ceramic coating thereon) can have significantly improved performance characteristics, such as a lower start/stop rate, a lower pressure differential, an increased rangeability, an increased life expectancy, and the ability to operate without adding or changing oil in the space around the timing gears.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in the various drawings indicate like elements.

DETAILED DESCRIPTION OF ILLUSTRATIVE EMBODIMENTS

Rotary gas meters are generally expected to provide accurate, reliable measurements over a long, perhaps even decades long, service life with a minimum of required maintenance. Long life and minimal maintenance, however, are two objectives that can be caught in a tradeoff: long lifespan can sometimes be achieved though routine maintenance, and extended maintenance intervals sometimes come at the cost of a shortened lifespan. For example, rotary gas meters are rotary machines with a number of moving parts such as impellers and gears that mesh, slide, or otherwise come into frictional contact with each other as well as nonmoving parts such as housings. Such frictional contact can cause these parts to wear causing the meter to possibly lose operational effectiveness (e.g., leakage, inaccuracy) or otherwise malfunction or cease operation (e.g., jam).

Some rotary gas meters in use implement lubricants (e.g., oil) and a lubricant bath to reduce the friction of internal parts that come into contact with each other. While lubricant baths extend the service life of the rotary meters by reducing the friction-induced wear of internal parts, such life comes with a tradeoff: periodic maintenance. Generally, the lubricant oil may need to be exchanged periodically. In the case of gas meters, which are generally installed in substantially permanent configurations, such periodic attention may require service in the field that can be costly and/or time consuming.

As described herein, some embodiments of gas flow meter devices (including rotary gas meters) can be constructed in a manner that enhances wearability and life expectancy of the internal components, and substantially reduces or otherwise eliminates the need for lubricant baths and lubricant field service (e.g., repair or exchange of oil bath compartments). In addition, some embodiments of the gas flow meter device can employ ceramic materials for selected components within the meter housing to lower the amount of torque required to start and run the meter device, lower the pressure differential imposed by the meter device, and increase the rangeability of the meter device, all of which thereby contribute to a significant increase to the gas measurement accuracy of the meter device.

Figure 1:
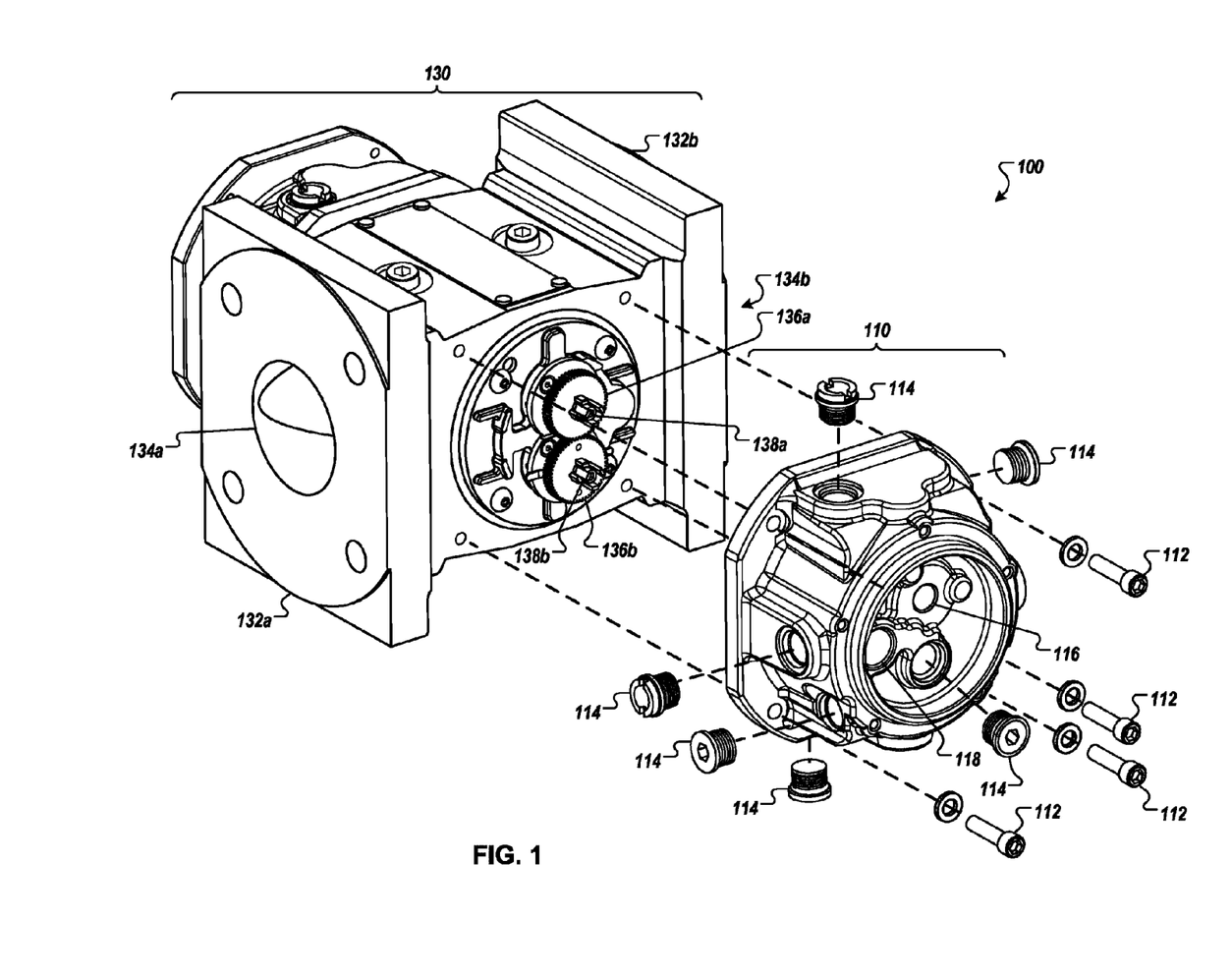
FIG. 1 shows a partly exploded perspective view of an example gas flow meter device, in accordance with some embodiment.
Figure 2:
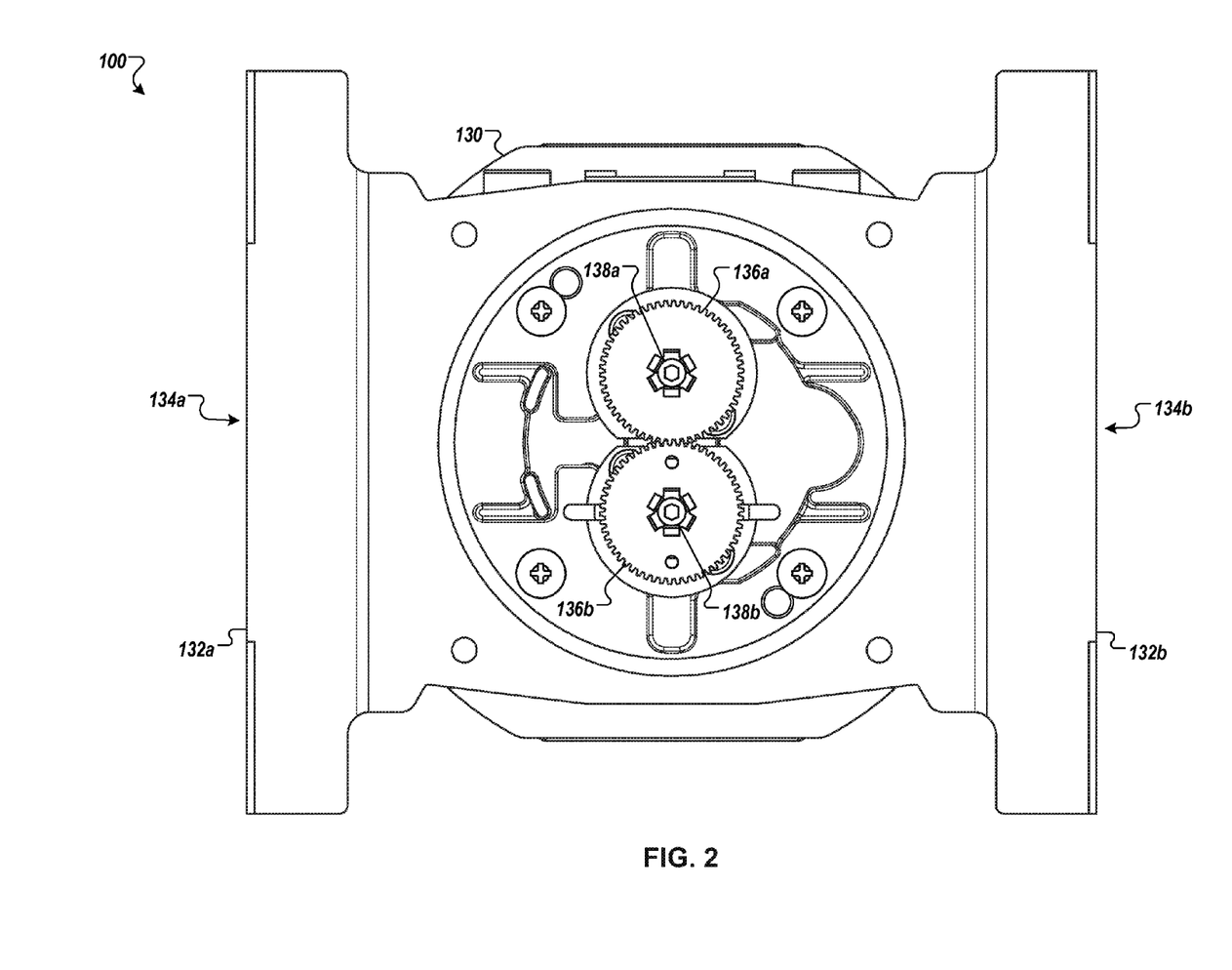
FIG. 2 is an end view of a portion of the gas flow meter device of FIG. 1.

Referring now to FIGS. 1-2, a gas flow meter device 100 includes a housing 130 and a cap 110. The meter device 100, in this embodiment, may be a rotary gas meter that is employed in a flow system to measure a volume of gas that passes through the housing 130. The housing 130 includes connector plates 132a and 132b that can be coupled to fluid conduits (e.g., gas flow pipes). An inlet 134a is formed in the connector plate 132a to allow fluid to pass into the interior of the housing 130. Likewise, an outlet 134b is defined by the second connector plate 132b. As described below in connection with FIGS. 4A-5B, the housing 130 includes a pair of impellers (not shown in FIGS. 1-2) that rotate in response to fluid flow between the inlet 134a and the outlet 134b. As a fluid (e.g., natural gas in this embodiment) flows through the interior of the housing 130 and between the inlet 134a and the outlet 134b, impellers are urged to rotate due to the fluid pressure acting upon the surface of the impellers. It should be noted that the flow of gas is not limited to that as described and, for example, the meter device 100 may be arranged in some embodiments so that the fluid flows from the outlet 134b to the inlet 134a to drive the impellers.

The meter device 10 comprises a set of timing gears 136a-b that engage one another and rotate in response to rotation of the impellers. The timing gears 136a-b are coupled to at least one of the impellers so that, as the impellers rotate due to the fluid flow through the meter device 100, so too do the timing gears 136a-136b. In some embodiments, each of the timing gears 136a-b comprises an exterior surface coating comprises a hard ceramic material. The exterior surface coating may be arranged at least at the gear teeth of each of the timing gears 136a-b. In particular embodiments, the exterior surface coating on the timing gears 136a-b comprises a selected ceramic material, such as silicon nitride ($Si_3N_4$) material. The ceramic material for the exterior surface coating of the timing gears may be selected due to the material being a hard ceramic having a high tensile strength over a broad temperature range, moderate thermal conductivity, low coefficient of thermal expansion, moderately high elastic modulus, and an unusually high fracture toughness for a ceramic.

In some implementations, the exterior surface coating of the timing gears 136a-b is provided to increase the wearability of these components by increasing the material hardness property and reducing friction at the timing gear interface. For example, the ceramic coating can enhance the wearability of the hard-coated timing gears 136a-b and reduce the rolling friction between them. In some circumstances, the ceramic coating exhibits a substantially self-lubricating property that may be used to substantially reduce or eliminate the need to house the timing gears 136a-b in a sealed oil bath compartment. Thus, the ceramic material for the timing gears can be selected to provide high hardness, low weight, low coefficient of friction, high operating temperature range, and the ability to operate with minimal lubrication The cap 110 is formed to substantially cover the timing gears 136a-136b. The cap 110 is secured by a collection of bolts 112 that pass through holes in the cap and thread into the housing. A collection of plugs 114 thread into the cap 110. In some implementations, the plugs 114 may be removed to provide access to the interior of the cap 110, for example, to gain access to the hard-coated timing gears 136a-136a without disassembling the cap 110 from the housing 130. In this embodiment, the cap 110 is not required to contain or define a sealed compartment for a lubrication oil bath. In particular, the timing gears 136a-b are configured to operate in an oilless environment in which the space surrounding the timing gears 136a-b is oil free. As previously described, such a configuration can substantially reduce the burden of servicing and repairing the meter device 100.

Still referring to FIGS. 1-2, the timing gears 136a-136b each rotate about parallel axes defined by parallel shafts 138a-b. Each of the shafts 138a-b may extend into the meter housing 130 so as to couple with a corresponding one of the impellers. As such, when the impellers rotate due to gas flow through the housing 130, the shafts 138a-b drive the rotation of the timing gears 136a-b, which in turn interface with one another to maintain the timing of the impeller rotation. Such a configuration permits the impellers to rotate in a predetermining timing that prevents one of the impellers from slipping or jamming relative to the other one of the impellers. As described in more detail below, one of the timing gears 136a-b can also serves as an input for the meter readout unit 300 (FIG. 3).

In some implementations, the exterior surface coating of the timing gears 136a-b may be impregnated with a lubricant prior to assembly into the meter 100. For example, the porosity of some ceramic coatings may promote the absorption of a quantity of lubricant that may be sufficient to weep out of the ceramic material at a rate that provides adequate lubrication for substantially the service lifetime of the timing gears 136a-136b. As such, the meter device 100 may be operated without the need for adding or changing external oil lubrication (e.g., in an oil bath compartment) for the hard-coated timing gears 136a-136b. As previously described, the ceramic coating of the timing gears 136a-136b hardens the gears to improve wearability, as well as provide a self-lubricating property that substantially reduces or eliminates the need for oil bath or other such supply of lubricant to extend the life of the hard-coated timing gears 136a-136b In some implementations, by reducing the friction of the hard-coated timing gears 136a-136b through the use of a ceramic coating, the accuracy of the meter 100 may be improved. For example, static friction may be reduced thereby enabling the meter to begin rotating in response to a low flow and/or pressure of gas. In another example, dynamic friction may be reduced thereby reducing the pressure drop that the meter 100 may cause to a fluid flow.

Figure 3:
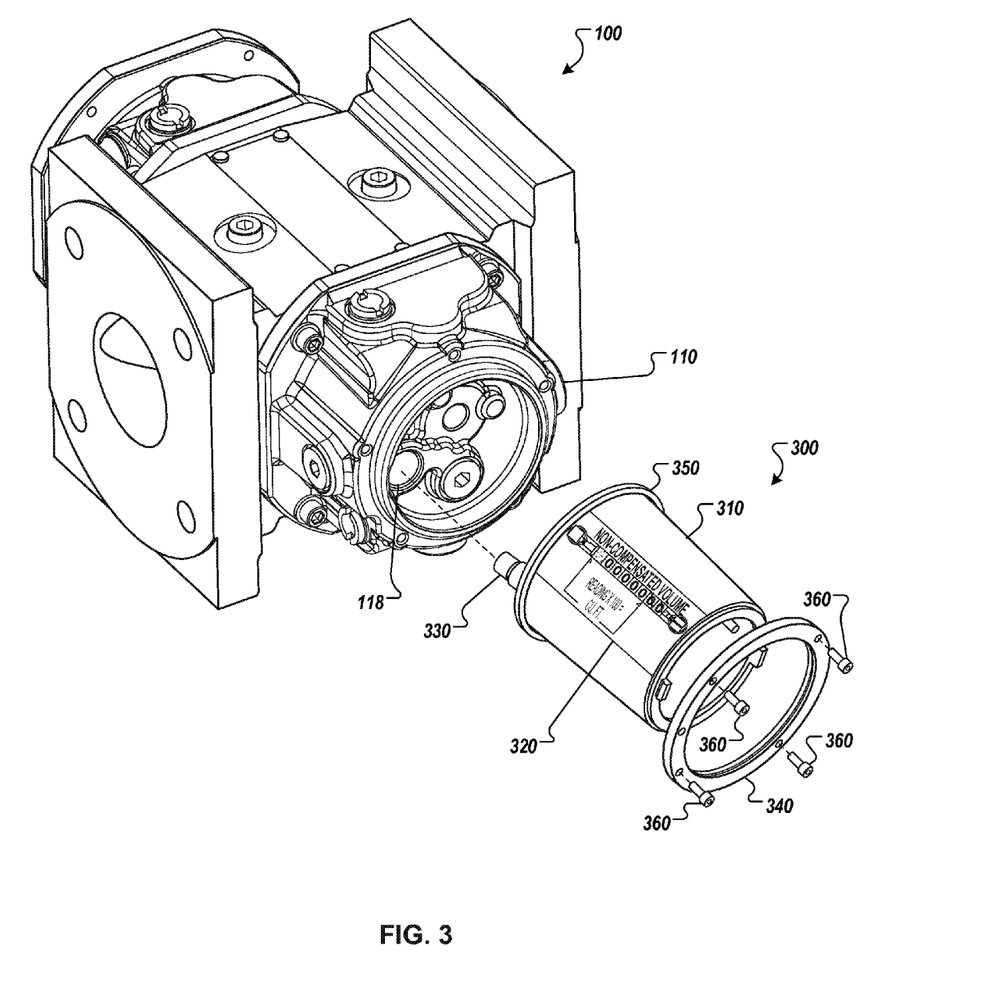
FIG. 3 is a perspective view of the meter device of FIG. 1 having a readout unit coupled thereto, in accordance with some embodiments.
Figure 4A:
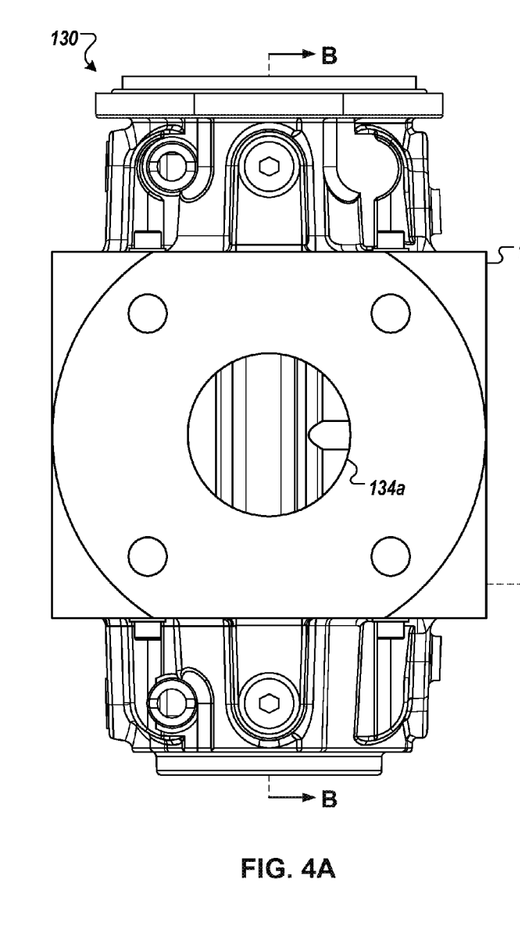
FIGS. 4A and 4B are side and cross-sectional views of a portion of the meter device of FIG. 1.
Figure 4B:
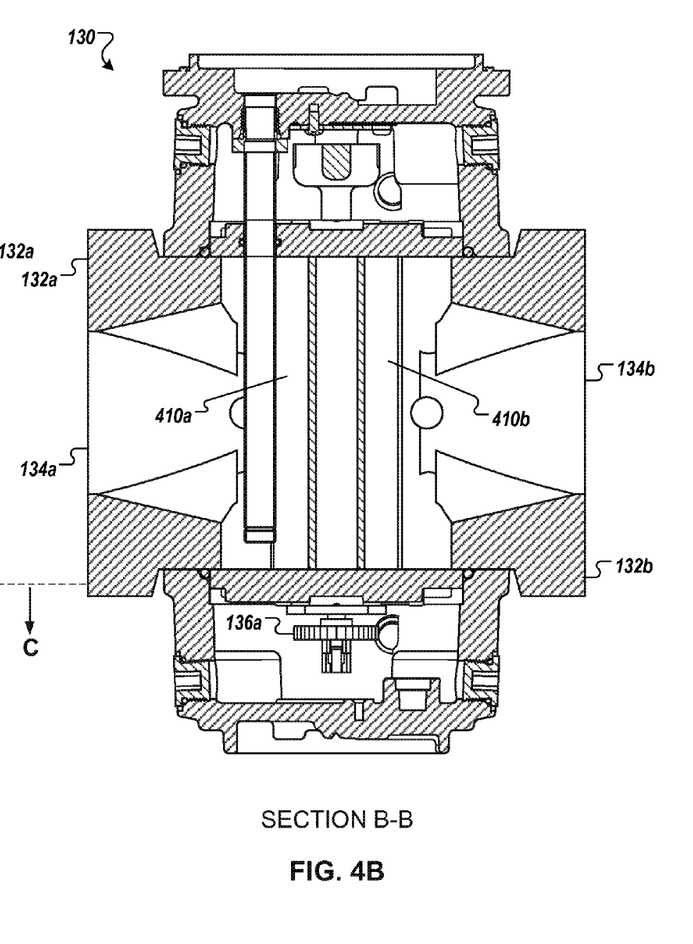
Figure 5A:
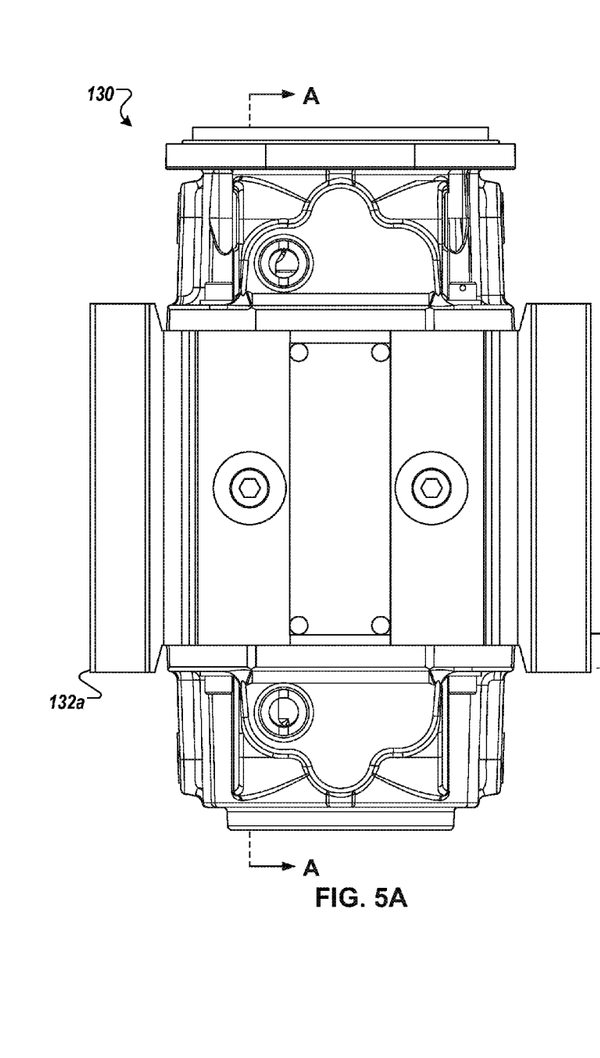
FIGS. 5A and 5B are top and cross-sectional views of a portion of the meter device of FIG. 1.
Figure 5B:
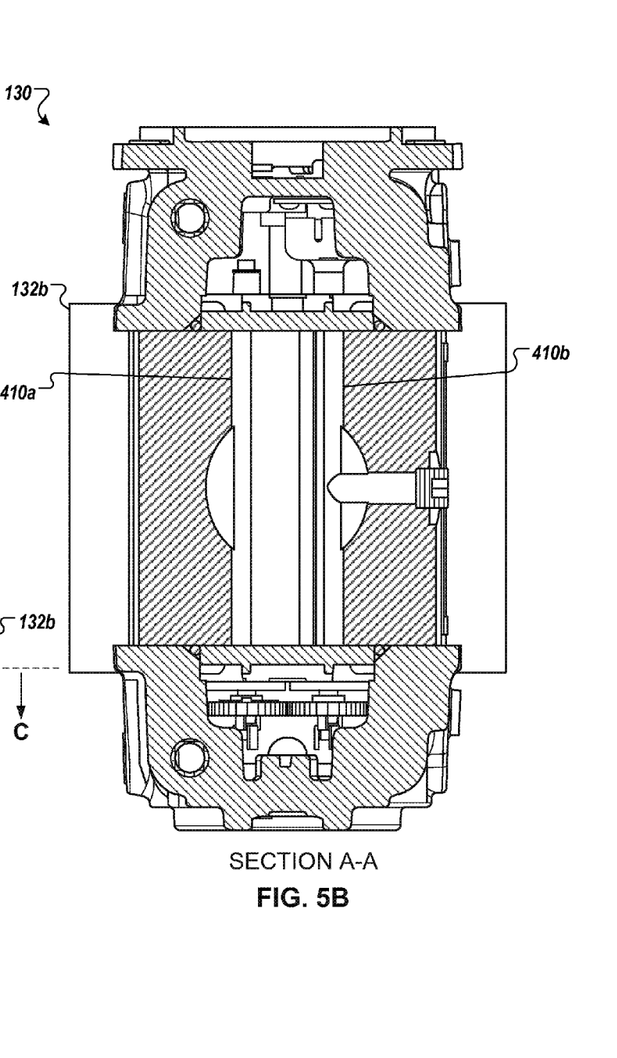

Referring now to FIG. 3, the meter device 100 may include a meter readout unit 300 that couples to the cap 110 and provides a numeric indicator of the volume of gas flow through the meter device 100. A cavity 118 formed in the cap 110 provides a space in which an input shaft for a meter readout unit 300 may be inserted. In this embodiment, the meter readout unit 300 provides an index readout of the operation of the meter device 100. For example, the meter readout unit 300 may indicate a totalized volume, a flow rate, or other measurement of gas flow through the meter 100.

The meter readout unit 300 includes a housing 310 and an indicator 320. The indicator 320 displays information about the flow of gas through the meter 100 such as compensated or non-compensated volume, flow rate, or other information that can describe a fluid flow. In some implementations, the indicator 320 may include rotary dials, mechanical odometer-style display, or an electronic display. In some embodiments, the meter unit 300 may provide a mechanical or electrical output indicative of the meter's 100 operation (e.g., an interface for external measurement or corrector equipment) in addition to, or in lieu of, the indicator 320. In some embodiments, the housing 310 may be partly or entirely substantially transparent to permit an observer to view the indicator 320. For example, the housing 310 may be made of a substantially clear material such as lexan or glass, or may include a window made of such material.

An input shaft 330 of the meter readout unit 300 is rotatable to drive the operation of the indicator 320. As the meter readout unit 300 is assembled to the meter device 100, the meter drive shaft 330 is inserted into the cavity 118. In operation, at least one of the timing gears 136a-136b engages with gear teeth on the input shaft 330 so as to drive the input shaft 330, and in turn, the indicator 320. In other implementations, the input shaft 330 may be coupled to at least one of the timing gears 136a-b in a different manner so that the input shaft 330 rotates in response to rotation of the timing gears 136a-b.

Still referring to FIG. 3, a retaining ring 340 may be assembled with the meter unit 300 to substantially contact a rim 350 of the meter housing 310. A number of bolts 360 may be inserted through holes in the retaining ring to be threaded into the cap 110. As the bolts 360 are tightened, the rim 350 is compressed between the cap 110 and the retaining ring 340 to removably affix the meter unit 300 to the meter 100.

Referring now to FIGS. 4A-B and 5A-B, some embodiments of the meter device 100 include a pair of impellers 410a-b that are configured to rotate in response to fluid flow through the housing 130 of the meter device 100. In this embodiment, a first impeller 410a and a second impeller 410b are formed as in a "roots" configuration, wherein the flow (e.g., positive displacement) of gas through the housing 130 urges the impellers 410a-410b to rotate. The impellers 410a-410b can be formed as two shaped lobes (e.g., having a "FIG. 8" shape), that spin in precise alignment as dictated by the timing gears 136a-b. With each turn, the impellers 410a-b move a specific quantity of gas through the meter housing 130. Each impeller 410a-b is supported on a shaft that is rotationally supported by roller bearings (described in more detail below). As the impellers rotate, the impeller shafts also cause the timing gears 136a-b to rotate, and the timing gears 136a-b interface with one another to maintain the specific timing of the two impellers 410a-b.

Figure 6:
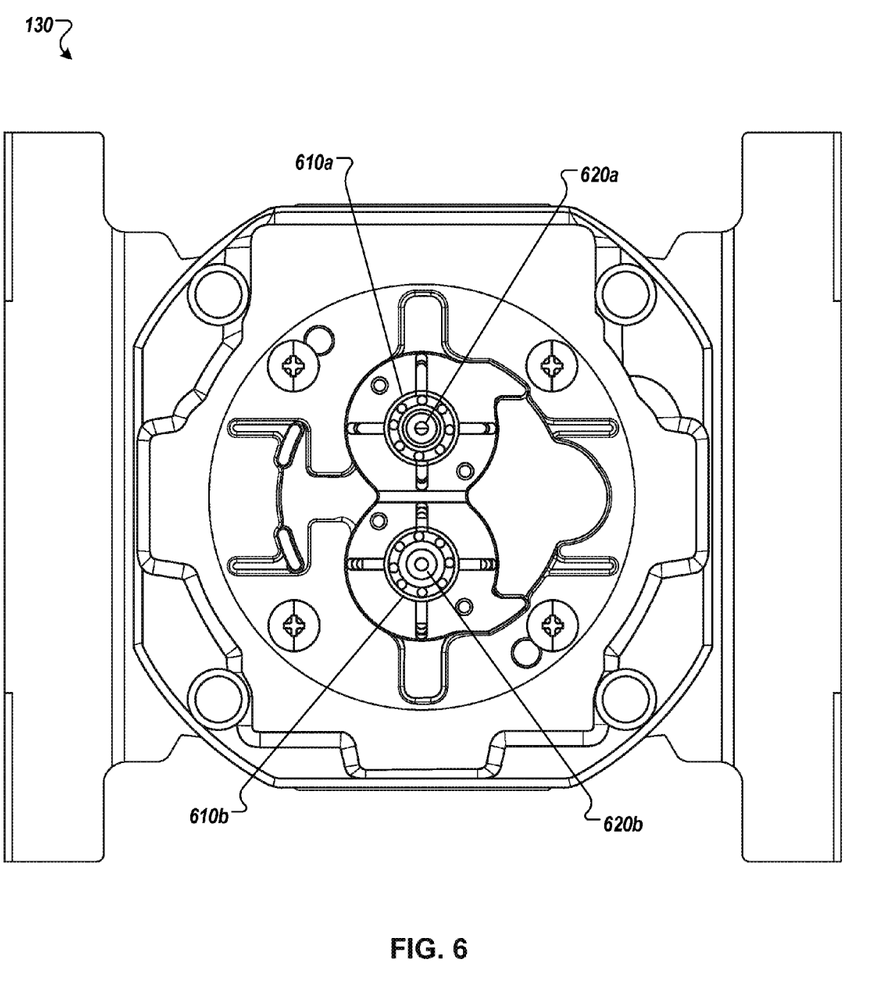
FIG. 6 is an end view of a portion of the gas flow meter device of FIG. 1.

Referring now to FIG. 6, each of the impellers 410a-b is rotational supported in the housing 130 by a corresponding roller bearing 610a-b, respectively. The roller bearing 610a supports a drive shaft 620a in the meter housing 130, which is coupled to the impeller 410a such that rotation of the impeller 410a urges the drive shaft 620a to rotate as well. Likewise, a roller bearing 610b supports a second drive shaft 620b in the housing 130, which is coupled to the second impeller 410b. Additional roller bearings (not shown), substantially similar to the roller bearings 610a-610b, may be installed at the opposite end of the housing 130 so as to support the opposing ends of the drive shafts 620a-620b. As previously described, each of the roller bearings 610a-b can be constructed as a hybrid bearing having ceramic rolling elements and steel raceways. In such circumstances, the bearing supports 610a-b for the impellers 410a-b can significantly improve the performance of the meter device by providing a lower start/stop rate and lower pressure differential, and further the hybrid bearings 610a-b can allow the impellers to rotate with little or no lubricants internal to the bearing housing.

Figure 7:
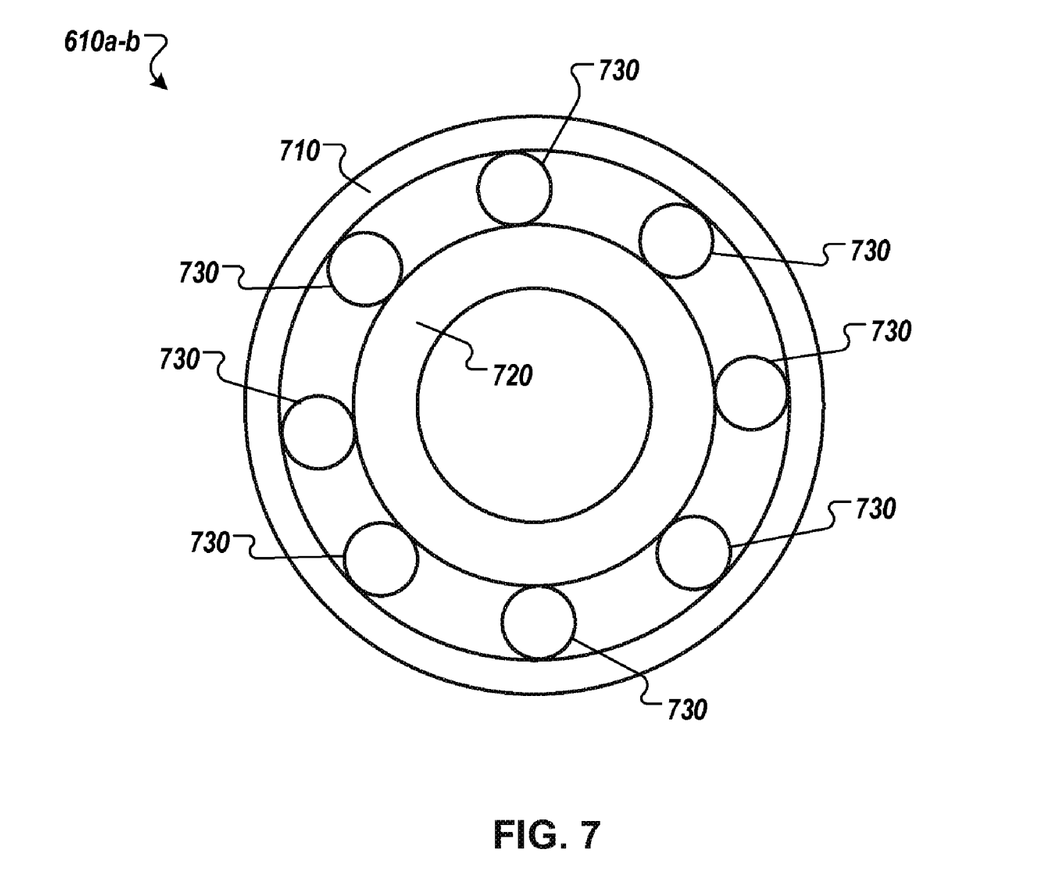
FIG. 7 is a front view of an example roller bearing of the gas flow meter device of FIG. 6.

Referring now to FIG. 7, each of the hybrid bearings 610a-b used in the meter device 100 to support the impellers includes an outer raceway 710 and an inner raceway 720 that retain a collection of rolling elements 730. In this embodiment, the rolling elements may be cylindrical members that roll about the inner surfaces of the raceways 710-720 to form a roller bearing. In other embodiments, the raceways 710-720 and the rolling elements 730 may form other types of bearings. For example, the rolling elements may be substantially spherical to create a ball bearing, or elongated and tapered to form a needle bearing.

In the depicted embodiment, the outer raceway 710 and the inner raceway 720 comprise a metal material, such as steel. The hybrid bearings 610a-b may be constructed in a manner such that dissimilar materials engage one another along the raceways 710 and 720. For example, in some embodiments, the rolling elements 730 comprise a ceramic material to interface with the metal surfaces of the raceways 710 and 720. In the depicted embodiments, the rolling elements 730 comprise a ceramic material, such as silicon nitride, having properties to provide improved performance of the meter device 100. In general, silicon nitride hybrid rolling elements 730, with the high hardness and the "natural" lubricant property of the material, reduce the friction between the raceways 710 and 720 or "bearing track". In particular embodiments, the silicon nitride hybrid rolling elements 730 can be substantially harder than the metal surfaces of the raceways 710 and 720, which may reduce the friction with the raceway or "bearing track". In some implementations, this can result in the bearings exhibiting approximately 80% less friction, approximately 3 to 10 times longer lifetime, approximately 80% higher speed, approximately 60% less weight, the ability to operate with lubrication starvation (e.g., reduced or eliminated oil lubricant inside the bearing), higher corrosion resistance and higher operation temperature, as compared to traditional metal bearings. In some implementations, silicon nitride rolling elements may weigh approximately 79% less than steel rolling elements of a similar size and configuration.

As previously described, the hybrid bearings 610a-b employed in the meter device 100 can significantly improve the performance characteristics of the meter device 100. For example, by reducing the amount of bearing mass that needs to be urged by the gas flow, the impellers 410a-410b may be able to rotate at a lower flow and/or pressure of gas through the meter device 100. Similarly, by reducing the rotating mass being urged by the impellers 410a-b, the meter device 100 may be made more responsive to changes in the gas flow thereby enabling the meter to measure the changing flows more accurately.

The ceramic material also reduces the rolling friction that occurs when the rolling elements 730 roll about the raceways 710, which in some implementations, may also improve the performance of the meter 100. For example, by reducing the friction of the roller bearing 700 through the use of ceramic material, static friction may be reduced thereby enabling the impellers 410a-b to begin rotating in response to a flow of gas, the accuracy of the meter 100 may be improved. For example, static friction may be reduced thereby enabling the impellers 410a-b to begin rotating in response to a low flow and/or pressure of gas. In another example, dynamic friction may be reduced thereby reducing the pressure drop that the meter device 100 may cause to a fluid flow.

As previously described, the roller bearings 610a-610b are installed in the meter housing in a substantially oil-free surrounding space. The ceramic components of the hybrid bearings 610a-610b and 700 improve wearability, as well as provide a self-lubricating property that substantially reduces or eliminates the need for an external oil bath or other such external supply of lubricant to extend the life of the roller bearings 610a-610b in the meter device 100. In some implementations, the use of dissimilar materials (e.g, the steel of the raceways 710-720 and the ceramic of the rolling elements 730) can also improve wearability of the bearing 700 in comparison to traditional bearings used in gas flow meters.

In some implementations, the ceramic material of the rolling elements 730 may be impregnated with lubricant prior to assembly of the bearings 610a-b into the meter 100. For example, the porosity of some ceramics may promote the absorption of a quantity of lubricant that may be sufficient to weep out of the ceramic material at a rate adequate to provide lubrication for substantially the service lifetime of the roller bearings 610a-610b. As such, the bearings 610a-b may operate within the meter device 100 for the life of the meter device without the requirement to add or change oil lubricants for the roller bearings 610a-610b.

A number of implementations have been described. Nevertheless, it will be understood that various modifications may be made without departing from the spirit and scope. Accordingly, other implementations are within the scope of the following claims.

What is claimed is:

1. A meter device for measuring volume flow of gas, comprising:
    a flow meter housing having an inlet and an outlet through which a fluid flows to rotate first and second impellers;
    first and second shafts in the housing that rotates in response to rotation of the first and second impellers, the first shaft being rotatably supported in the housing by at least a first roller bearing, the second shaft being rotatably supported in the housing by at least a second roller bearing, wherein each of the first and second roller bearings includes metal raceways that engage with ceramic rolling elements; and
    first and second timing gears having an exterior ceramic coating and that rotate in response to rotation of the first and second shafts, wherein the timing gears engaging one another along the exterior ceramic coating in an oil-less environment in which space surrounding the timing gears is free of oil.

2. The meter device of claim 1, wherein the first and second impellers are rotated in a predetermined timing pattern that is dictated by the first and second timing gears having the exterior ceramic coating.

3. The meter device of claim 2, wherein the exterior ceramic coating of the first and second timing gears comprises a silicon nitride material.

4. The meter device of claim 1, wherein the ceramic rolling elements of the first and second roller bearing comprises a silicon nitride material.

5. The meter device of claim 4, wherein the raceways of the first and second roller bearings comprises a steel material.

6. The meter device of claim 5, wherein the ceramic rolling elements of the first and second roller bearings is impregnated with a lubricant before the first and second roller bearings rotatably support the first and second shaft in the housing.

7. The meter device of claim 1, further comprising a meter readout unit coupled to the flow meter housing, the meter readout unit including an input shaft that is driven to rotate in response to rotation of the timing gears, the meter readout unit comprising a display window that indicates numeric indicia of an amount of fluid flow through the housing.

8. A method of operating a gas flow meter device, comprising:
    rotating first and second impellers in a gas flow meter housing as a gas is advanced from an inlet to an outlet, the first impeller being supported by a first shaft rotatably mounted in the housing, and the second impeller being supported by a second shaft rotatably mounted in the housing;

in response to rotation of the first and second impellers, causing first and second hybrid bearing assemblies to rotate in the housing such that ceramic rolling elements contained in each of the hybrid bearing assemblies engage with metal raceways, the first hybrid bearing assembly rotatably supporting the first shaft in the housing and the second hybrid bearing assembly rotatably supporting the second shaft in the housing; and in response to rotation of the first and second impellers, causing first and second timing gears having an exterior ceramic coating to rotate and engage one another in an oil-less environment in which space surrounding the timing gears is free of oil.

9. The method of claim 8, wherein the step of rotating the first and second impellers comprises rotating the first and second impellers in a predetermined timing pattern that is dictated by the first and second timing gears having the exterior ceramic coating.

10. The method of claim 9, wherein the exterior ceramic coating of the first and second timing gears comprises a silicon nitride material.

11. The method of claim 8, wherein the ceramic rolling elements of the first and second roller bearing comprises a silicon nitride material.

12. The method of claim 11, wherein the raceways of the first and second roller bearings comprises a steel material.

13. The method of claim 12, wherein the ceramic rolling elements of the first and second roller bearings is impregnated with a lubricant before the first and second roller bearings rotatably support the first and second shaft in the housing.

14. The method of claim 8, further comprising driving a meter readout unit to output numeric indicia of an amount of fluid flow through the housing, the meter readout unit being coupled to the meter housing and including an input shaft that is driven to rotate in response to rotation of the timing gears.

* * * * *